UNITED STATES PATENT OFFICE 1,922,641

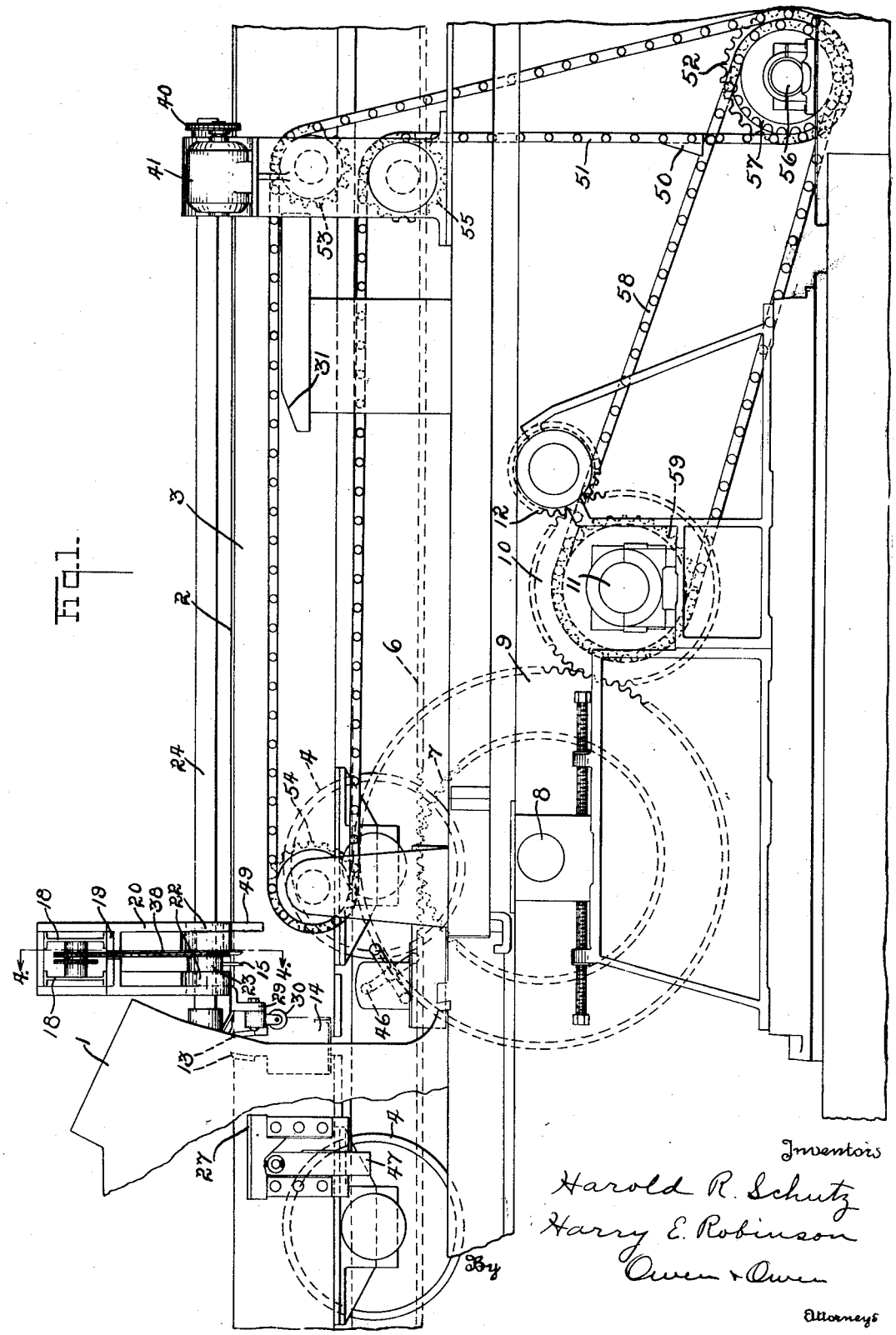

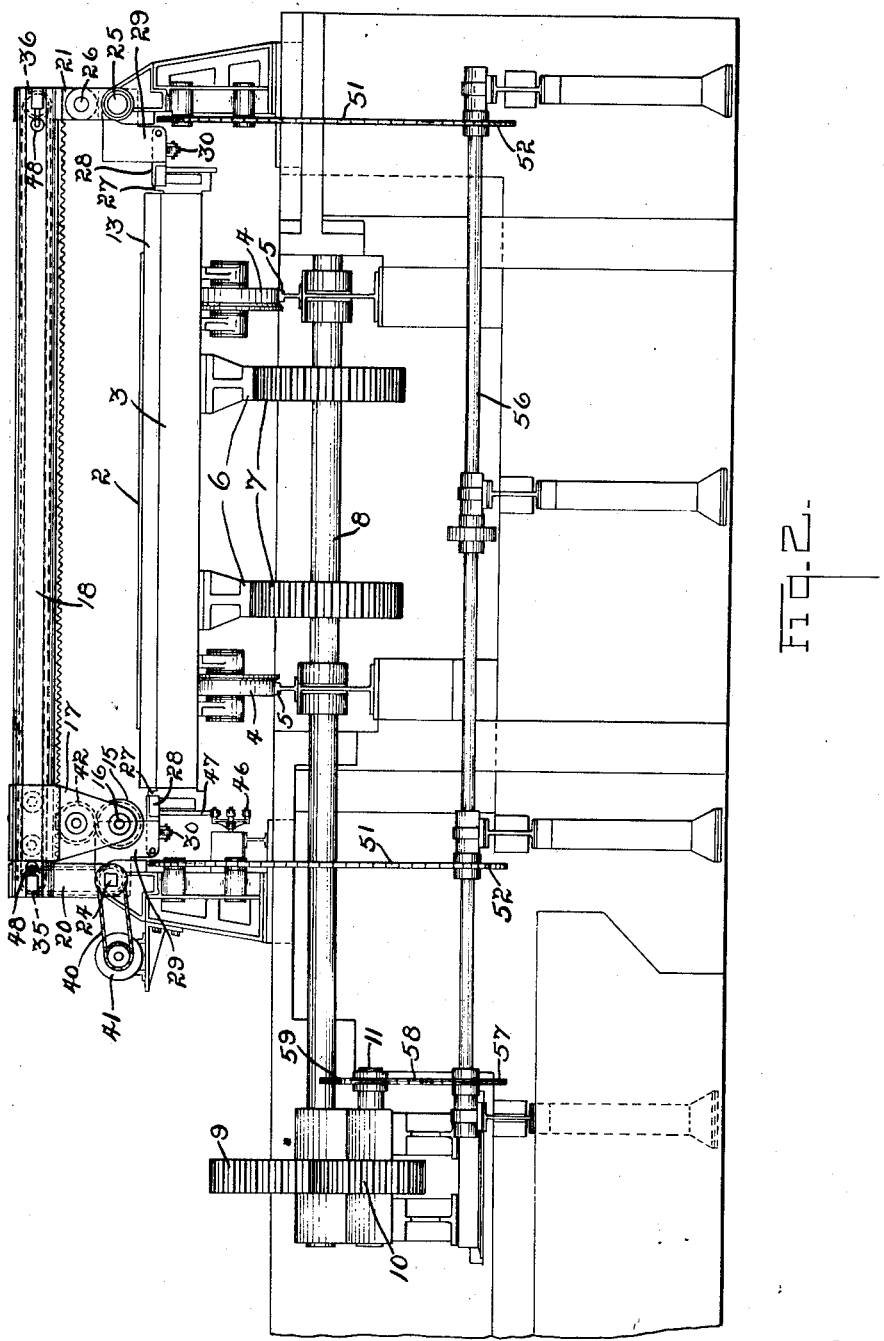

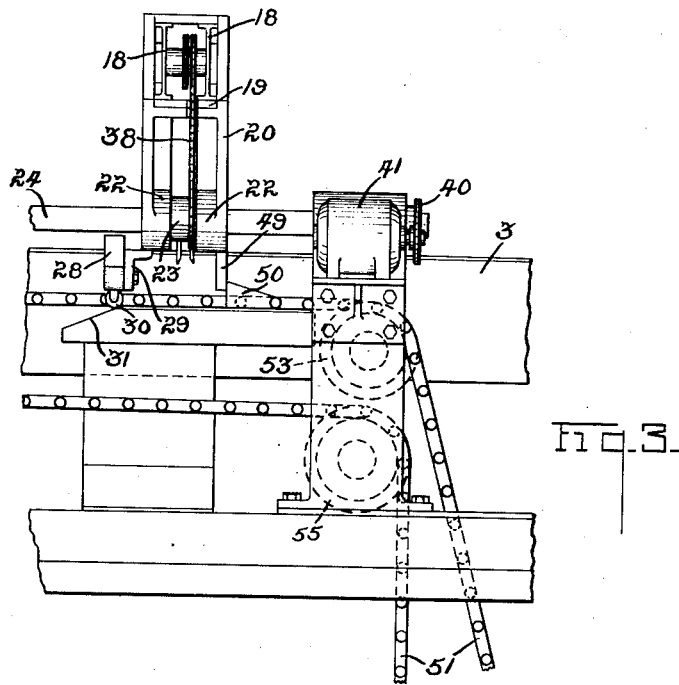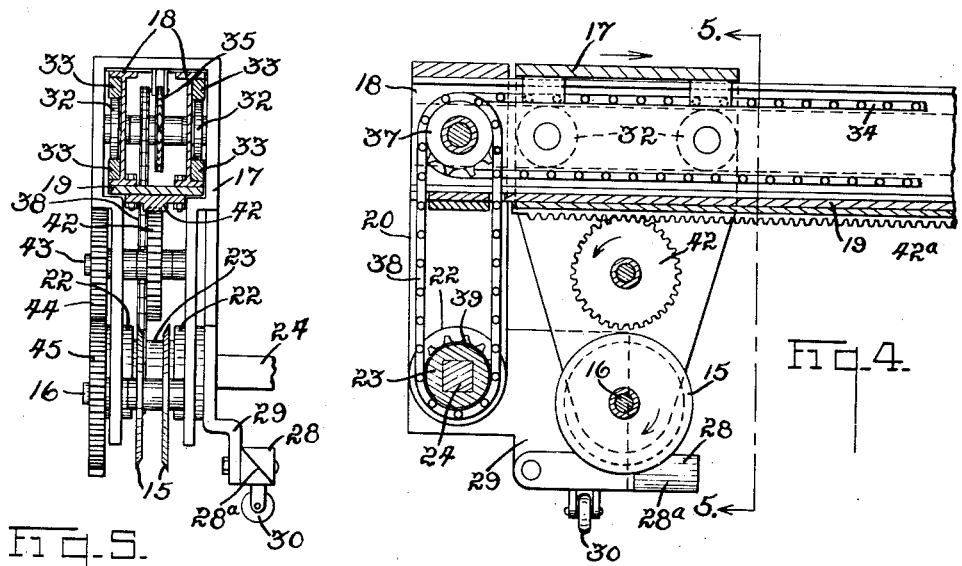

CUTTING MECHANISM FOR SHEET MATERIAL

Harold R. Schutz and Harry E. Robinson, Toledo, Ohio, assignors, by mesne assignments, to Libbey-Owens-Ford Glass Company, Toledo, Ohio, a Corporation of Ohio Application February 1, 1929. Serial No. 336,872

17 Claims. (Cl. 49—14)

This invention relates to a cutting mechanism adapted to be used in cutting sheet material, as for example, in cutting glass sheets or the like into separate units, while in a plastic condition. Although the invention has been developed in connection with the manufacture of plate glass, it is apparent that similar mechanism may also be used advantageously in the cutting of window glass or sheet glass in plastic condition and in the cutting of other sheet material of a similar nature.

The cutting mechanism to which the invention relates may be used for cutting glass in plastic condition, which has been formed in sheets by means of any of the usual rolling or casting processes. In the present adaptation of the invention, the glass, as it leaves the forming apparatus, is delivered to a number of successive tables, preferably of cast iron. These tables are set end to end in such a manner that a small gap is provided between the rear of one table and the front end of the succeeding table, and the edges of this gap are provided with ledger blades, with which rotary cutting elements co-operate to remove a narrow strip of glass, which separates the sheet on one table from that on the next table. Instead of a plurality of tables, it is quite feasible to use a single long table provided with proper recesses to form cutting gaps with which the cutting discs co-operate.

In connection with the invention, means are provided for engaging the cutter carriage, as the cutting gap comes beneath the cutting discs, and to cause the cutter carriage to travel forwardly for a certain distance in synchronism with the forward travel of the tables. During this forward travel of the cutter carriage, the cutting discs are moved across the glass, while the discs rotate in shearing relation to the ledger blades at the edges of the gap.

One of the objects of the present invention is to provide improved means for controlling the movement of the cutter carriage, and particularly for returning the carriage to its original position after it has completed its forward movement with the table. The means for effecting this return movement are positive in action and the carriage is returned by a slow and uniform movement, in time to be picked up by the next table.

Another object of the invention is to provide improved means for rotating the cutting discs and for moving the same from one side of the table to the other at the proper time and in proper sequence to the movement of the table and cutter carriage.

The objects and advantages of the invention will be more particularly explained in connection with the accompanying drawings, which illustrate one embodiment thereof.

In the drawings:

Figure 1 is a side elevation of the invention.

Figure 2 is a front elevation thereof.

Figure 3 is a partial side elevation, similar to Figure 1, but showing the cutter carriage in a different position.

Figure 4 is a sectional view taken on the line 4—4 of Figure 1.

Figure 5 is a sectional view taken on the line 5—5 of Figure 4.

As explained above, the present invention may be used in connection with any of the usual processes for manufacturing sheet glass. In Figure 1 the reference numeral 1 indicates the delivery end of a rolling machine from which the sheet 2 is rolled out and delivered upon the surfaces of a series of tables 3, as they advance in synchronism with the rolling machine. In the manufacturing process generally used, it is customary to use two intermediate tables, each having a surface of the same length as the plates to be cut, and two short end tables, which are adapted to receive the waste ends. These tables are supported by suitable wheels 4 on tracks 5 and are adapted to be advanced continuously with each batch of glass, and to be returned to their initial position after the glass has been transferred therefrom to the annealing ovens.

For imparting movement to the tables, racks 6 are secured to the bottom thereof and mesh with gears 7 secured to a transverse shaft 8 journaled beneath the tracks 5. A gear 9 secured to the shaft 8 meshes with a smaller gear 10 which is mounted on a jack shaft 11 and driven from a pinion 12, the latter being slowly driven in synchronism with the rolling machine. Adjacent table ends are separated by a small gap and are provided with ledger blades 13 between which a strip of glass is removed transversely of the sheet and drops into a suitable trough 14 located beneath the same.

The cutting mechanism comprises cutting discs 15 which operate in shearing relation to the ledger blades 13 at the proper time during the forward travel of the tables. The cutting discs 15 are secured to a shaft 16 which is journaled in a frame or yoke 17. This yoke is supported for movement transversely to the tables by a cutter carriage, which, in the present instance, comprises a pair of transversely disposed I-beams 18 secured to a horizontal rail 19. These beams are supported at the ends by brackets 20 and 21 respectively. The bracket 20 is formed with bearing portions 22 in which a bushing 23 is mounted for rotation but held against axial movement. The bushing 23 is supported by a non-circular shaft 24 on which it is longitudinally slidable. The bracket 21 is slidably supported on a longitudinally disposed shaft 25 which is round, and the bracket 21 is in two parts hinged together at 26. This construction permits the bracket 21 to adjust itself automatically to compensate for variations in the length of the beams 18 due to changes in temperature. Without such compensation, the heat from the glass would cause such a longitudinal expansion of the beams 18 as to cause the carriage to bind on the shafts 24 and 25.

At the beginning of the operation, the cutter carriage is near the delivery end of the rolling machine 1, as shown in Figure 1. Each table has an abutment 27 on each side near its front end, which, as the table travels forwardly, is adapted to engage a dog 28 pivotally supported on an arm 29 depending from a part of the cutter carriage. The relative location of the abutment 27 and the dog 28 is such that the cutter carriage begins to move forward in synchronism with the table at the moment when the cutting discs 15 are in alignment with the blades 13. The cutter carriage then travels forwardly with the tables until a roller 30, carried by the dog 28, engages and rides upon a stationary cam track 31, which lifts the dog above the abutment 27 and permits the table to continue its forward travel, leaving the cutter carriage stationary in the position shown in Figure 3. In case the tables are to be returned on the same tracks, after the glass is delivered to the ovens, each dog has an inclined face 28ª, so that it may ride over the abutment 27 during such return movement.

While the cutter carriage is traveling forwardly with the table, the yoke 17 with the discs 15 is moved transversely from one side of the table to the other to remove the strip of glass between the blades 13. For this purpose, the yoke 17 is supported by rollers 32 which are guided between tracks 33 secured on the I-beams 18. For controlling this movement of the cutting discs, a sprocket chain 34 is secured to the yoke 17 and passes about sprocket wheels 35 and 36 mounted in the ends of the cutter carriage. One of the sprocket wheels, as 35, has another sprocket wheel 37 secured thereto and the sprocket wheel 37 is connected by a sprocket chain 38 to a sprocket wheel 39 secured to the bushing 23.

The non-circular shaft 24 is rotatably mounted at one side of the path of the tables and is adapted to be driven by sprocket gearing 40 or the like from a motor 41, thus driving the sprocket chain 34 to move the yoke 17 and cutting discs 15 across the table while the cutter carriage travels with the table. During this movement of the yoke 17 across the table, the gear 42 is continuously in mesh with a rack 42ª secured to the bottom side of the rail 19. This gear 42 is secured to a shaft 43 mounted in the yoke 17. The shaft 43 also has a gear 44 secured thereto and in mesh with a gear 45 secured to the cutter shaft 16. Thus as the yoke 17 is moved across the table, the edges of the cutting discs 15, which engage the glass, rotate rearwardly about the shaft 16, so that they sever the glass by a shearing action without causing it to wrinkle.

The motor 41, which drives the yoke 17 to move the cutting discs across the table, may be started by means of a rotary snap switch 46, which is adapted to be actuated by an arm 47 carried by the table. This operation of the switch to start the motor takes place after the abutment 27 engages the dog 28, so that the discs 15 are at this time in alignment with the blades 13. A limit switch 48 is located at each end of the I-beams 18 so that the operation of the cutting discs 15 is stopped after each movement across the table.

When the dogs 28 are released from engagement by the abutments 27, the cutter carriage temporarily remains stationary in the position shown in Figure 3 while the tables continue their forward travel. For returning the cutter carriage to its initial position, each end of the carriage is provided with a downwardly projecting lug 49 which extends into the path of a lug 50 carried by a sprocket chain 51. This sprocket chain passes about a sprocket wheel 52 located below and at one side of the table track and passes thence upwardly and over sprocket wheels 53 and 54 located alongside the path of the tables. From the sprocket wheel 54, the chain 51 passes over a sprocket wheel 55 located beneath the sprocket wheel 53 and thence back to the sprocket wheel 52. The length of the sprocket chain 51 and its rate of travel are such that the lug 50 engages the lug 49 shortly after the cutter carriage ceases its forward travel, and the lug 50 leaves the lug 49, when the cutter carriage has reached its initial position shown in Figure 1, before the next table has advanced far enough to again move the cutter carriage forwardly.

Both sprocket wheels 52 are secured to a transverse shaft 56 mounted beneath the path of the tables, and secured to the shaft 56 is a sprocket wheel 57 which is connected by a sprocket chain 58 to a sprocket wheel 59 secured on the shaft 11. The travel of the sprocket chain 51 is therefore synchronized with the travel of the tables which are actuated from the gear wheels 7.

From the foregoing description, it will be noted that the cutter carriage is periodically caused to move forwardly for a predetermined distance in synchronism with the tables and is subsequently returned to its initial position at a moderate uniform speed through the action of the positively driven chains 51 which are timed and arranged to leave the carriage in its initial position without any shock or jar. Shortly after the cutter carriage begins its forward travel the arm 47, mounted at one side of the table, actuates the switch 46 to start the motor 41. The cutter carriage is slidably supported by the shafts 24 and 25. The shaft 24 is non-circular, but is rotatably mounted and carries the bushing 23 which is rotatably held in the bearings 22 at one end of the cutter carriage. The shaft 24 and likewise the bushing 23 may therefore be rotated by the motor 41, which is mounted on a stationary base at one side of the table track, while the cutter carriage is travelling in sychronism with the tables. The rotation of the bushing 23, through the sprocket chain 38, causes the sprocket chain 34 to travel in an orbit lengthwise of the beams 18 of the cutter carriage. The supporting member or yoke 17 is therefore carried along the beams 18 across the path of the tables while the gear 42, which is continually in mesh with the rack 42ª, causes the cutting discs 15 to rotate in shearing relation to the blades 13 as above explained. In this operation the cutter moves only once across the path of the tables and then remains stationary until the carriage is returned to its initial position and is picked up by the next table. The cutter then moves across the path of the tables in the opposite direction.

In accordance with the present invention, the motor which drives the cutting discs as they move across the tables is located on a stationary base instead of being mounted upon the cutter carriage, as has heretofore been the custom. This eliminates the use of trolley wires and trouble due to poor contacts. The cutter carriage is relieved of the weight of the motor, reducing gear and other parts associated therewith, so that it may move freely back and forth on the guide shafts 24 and 25 with much less expenditure of power. The carriage itself may also be of simpler construction. The movement of the cutter carriage may be accurately guided on the shafts 24 and 25, especially when the bracket 21 is jointed as at 26, to allow for the longitudinal expansion of the beams 18 due to the high temperature of the glass.

The invention may, of course, be used in connection with a continuous procession of tables or in connection with a predetermined number of tables which are returned over the same track after the glass has been transferred to the ovens. In thus returning the tables, the dogs 28, by reason of the inclined faces 28ª, readily ride over the abutments 27 and each arm 47 is pivoted to the table in such a manner as to ride over the switch 46, in this return movement, without actuating the same.

While we have shown and described the detailed construction of the invention in the form which seems the most desirable, it is to be understood that this is only for the purpose of illustration and that various modifications may be made therein without any material departure from the scope of the invention as claimed.

What we claim is:

1. The combination with a table mounted for longitudinal travel and adapted to support a sheet to be cut, of a carriage, a cutter on said carriage, means for periodically advancing the carriage a predetermined distance in synchronism with the table, means for actuating the cutter to sever the sheet during the synchronous advance of the carriage, an endless chain having a rearwardly travelling lap adjacent the path of said carriage, a lug carried by the chain and engageable with the carriage to return the latter to initial position, as the lug traverses said lap, and means for controlling the speed of travel of the chain so that the lug engages the carriage after the cut is completed.

2. The combination with a table mounted for longitudinal travel and adapted to support a sheet to be cut, of parallel guides disposed longitudinally adjacent the path of the table, a carriage slidably supported on said guides, means for periodically moving the carriage forwardly for a predetermined distance in synchronism with the travel of the table, a cutter supported on said carriage, one of said guides comprising a rotatable shaft, means for rotating said shaft during the advance of the carriage, means actuated by the rotating shaft to sever the sheet, and means for returning the carriage to initial position after the cut is completed.

3. The combination with a table mounted for longitudinal travel and adapted to support a sheet to be cut, of a cutter carriage, an abutment on the table for periodically engaging and advancing the carriage in synchronism with the table, means for releasing the carriage after it has completed a predetermined forward movement, and means moving in an orbital path for subsequently engaging the carriage and returning it at uniform speed to its initial position.

4. The combination with a table mounted for longitudinal travel and adapted to support a sheet to be cut, of a cutter carriage, means for periodically advancing the carriage a predetermined distance in synchronism with the table, an endless chain having a rearwardly travelling lap adjacent the path of said carriage, a lug carried by the chain and engageable with the carriage to return the latter to initial position as the lug traverses said lap after the carriage has completed its forward movement and while the table continues to travel forwardly.

5. The combination with a table mounted for longitudinal travel and adapted to support a sheet to be cut, of parallel guides disposed longitudinally adjacent the path of the table, a cutter carriage slidably supported on said guides, means for periodically sliding the carriage forwardly for a predetermined distance in synchronism with the travel of the table, and a member movable in an endless chain in synchronism with the means that moves the carriage forwardly, said member being engageable with the carriage to return it to initial position and timed so that its engagement occurs only after the carriage has completed its forward movement.

6. The combination with a table mounted for longitudinal travel and adapted to support a sheet to be cut, of parallel guides disposed longitudinally adjacent the path of the table, a carriage having supporting bearings slidably mounted on the respective guides, means for periodically sliding the carriage forwardly on said guides in synchronism with the table, means for subsequently returning the carriage to initial position, and a jointed connection between the carriage and one of its bearings to prevent binding of the bearings when the heat expands the carriage in a direction transverse to the guides.

7. In a sheet cutting device, the combination of a carriage, a plurality of parallel guides on which the carriage is slidable, one of said guides comprising a rotatable shaft, a motor mounted on a stationary base and operable to rotate said shaft while the carriage is sliding thereon, a cutter on said carriage, and means operable by the rotating shaft to actuate the cutter to cut a sheet supported therebeneath.

8. In a sheet cutting device, the combination of a carriage, a plurality of parallel guides on which the carriage is slidable, one of said guides comprising a rotatable shaft, a motor mounted on a stationary base and operable to rotate said shaft while the carriage is sliding thereon, said carriage comprising a beam disposed transversely to the movement of the carriage, a cutter on said beam, and means operable by the rotating shaft to move the cutter along the beam to cut a sheet supported therebeneath.

9. In a sheet cutting device, a plurality of parallel guides including a rotatable shaft, a beam disposed transversely to the guides, means for moving the beam longitudinally of the guides while said shaft is rotating, a cutter carried by the beam, and means actuated by the rotating shaft to move the cutter on the beam to cut a sheet supported therebeneath.

10. In a sheet cutting device, a carriage mounted for rectilinear travel, a supporting member mounted on said carriage, a cutter mounted on said supporting member, a motor mounted independently of said carriage, and means operable by said motor, while the carriage is travelling, to move said supporting member and cutter in a direction transverse to the travel of the carriage.

11. In a sheet cutting device, a carriage mounted for rectilinear travel, a supporting member mounted on said carriage, a rotatable cutter mounted on said supporting member, a motor mounted independently of said carriage, means operable by said motor, while the carriage is travelling, to move said supporting member and cutter in a direction transverse to the travel of the carriage, and means actuated by the movement of said supporting member on the carriage to rotate said cutter.

12. In a sheet cutting device, a carriage mounted for rectilinear travel, a rack secured to said carriage and disposed transversely to the direction of its travel, a supporting member mounted on the carriage, means for moving the supporting member longitudinally of said rack, a gear journaled on the supporting member and continuously in mesh with said rack, and a rotatable cutter carried by said supporting member and driven from said gear.

13. In a sheet cutting device, a carriage mounted for rectilinear travel, a supporting member guided for sliding movement on said carriage in a direction transverse to the travel of the carriage, a flexible element connected to said supporting member and mounted for orbital travel in a direction to effect the sliding movement of said member, means for driving said flexible element in either direction, a rack secured to the carriage, a gear journaled on said supporting member and continuously in mesh with said rack, and a rotatable cutter carried by said supporting member and driven from said gear.

14. In a sheet cutting device, the combination of a carriage, parallel guides on which the carriage is slidable, one of said guides comprising a rotatable shaft, a motor mounted independently of said carriage and operable to rotate said shaft while the carriage is sliding thereon, a supporting member mounted on said carriage, a cutter mounted on said supporting member, and means operable by the rotation of said shaft to move said supporting member and cutter in a direction transverse to the travel of the carriage.

15. In a sheet cutting device, the combination of a carriage, parallel guides on which the carriage is slidable, one of said guides comprising a rotatable shaft, a supporting member mounted on said carriage, a rotatable cutter mounted on said supporting member, a motor mounted independently of said carriage and operable to rotate said shaft while the carriage is sliding thereon, means operable by the rotation of said shaft to move said supporting member and cutter in a direction transverse to the travel of the carriage, and means actuated by the movement of said supporting member on the carriage to rotate said cutter.

16. In a sheet cutting device, the combination of a carriage, parallel guides on which the carriage is slidable, one of said guides comprising a rotatable shaft, a rack secured to said carriage and disposed transversely to the direction of its travel, a supporting member mounted on the carriage, a motor mounted independently of said carriage and operable to rotate said shaft while the carriage is sliding thereon, means operable by the rotation of said shaft to move the supporting member longitudinally of said rack, a gear journaled on the supporting member and continuously in mesh with said rack, and a rotatable cutter carried by said supporting member and driven from said gear.

17. In a sheet cutting device, the combination of a carriage, parallel guides on which the carriage is slidable, one of said guides comprising a rotatable shaft, a motor mounted independently of said carriage and operable to rotate said shaft while the carriage is sliding thereon, a supporting member mounted for sliding movement on said carriage in a direction transverse to the travel of the carriage, a flexible element connected to said supporting member and mounted for orbital travel in a direction to effect the sliding movement of said member, means operated by the rotation of said shaft for driving said flexible element in either direction, a rack secured to the carriage and disposed in the direction of the travel of said supporting member, a gear journaled on said supporting member and continuously in mesh with said rack, and a rotatable cutter carried by said supporting member and driven from said gear.

HAROLD R. SCHUTZ.
HARRY E. ROBINSON.